United States Patent [19]
Koliwer

[11] 4,453,904
[45] Jun. 12, 1984

[54] INJECTION MOLD DEVICE FOR FORMING AN ARTICLE SUCH AS FOOTWEAR

[75] Inventor: Wolfgang Koliwer, Achim, Fed. Rep. of Germany

[73] Assignee: Klöckner-Werke Aktiengesellschaft, Duisburg, Fed. Rep. of Germany

[21] Appl. No.: 517,652

[22] Filed: Jul. 27, 1983

[30] Foreign Application Priority Data

Oct. 6, 1982 [DE] Fed. Rep. of Germany ....... 3236933

[51] Int. Cl.³ .......................... B29C 1/06; B29F 1/022
[52] U.S. Cl. .................... 425/119; 12/128 C; 425/129 S
[58] Field of Search ............................ 425/119, 129 S; 12/128 C, 124; 264/244

[56] References Cited

U.S. PATENT DOCUMENTS

3,446,887  5/1969  Ludwig .............................. 264/244
3,500,502  3/1970  Santelmann ........................ 425/119

*Primary Examiner*—Willard E. Hoag
*Attorney, Agent, or Firm*—Watson, Cole, Grindle & Watson

[57] ABSTRACT

An injection mold device for forming an article such as footwear from a plastic material includes a two-part male die such as a boot last, a fabric liner covering the male die, and a split female die surrounding the male die in spaced relation and forming together therewith a mold cavity. Beyond the upper end of the cavity, liner retaining pins on the male die extend outwardly of the peripheral wall thereof for retaining the liner in place during the injection molding operation. One of the pins is mounted for retracting axial movement for disengaging the tip thereof from the liner, and such pin bears against a sloping bearing surface of a first removable male die part which facilitates such retracting movement upon a relative shifting of the parts. The other pins are rigidly mounted in the male die part and project into recesses of the female die having undercuts and grooves extending between the recesses and the mold cavity. The grooves, when filled, define plugs which adhere to the liner and are removable together with the liner from the rigidly mounted pins upon removal of the female die, the plugs being separated from the female die at the removal thereof.

5 Claims, 3 Drawing Figures

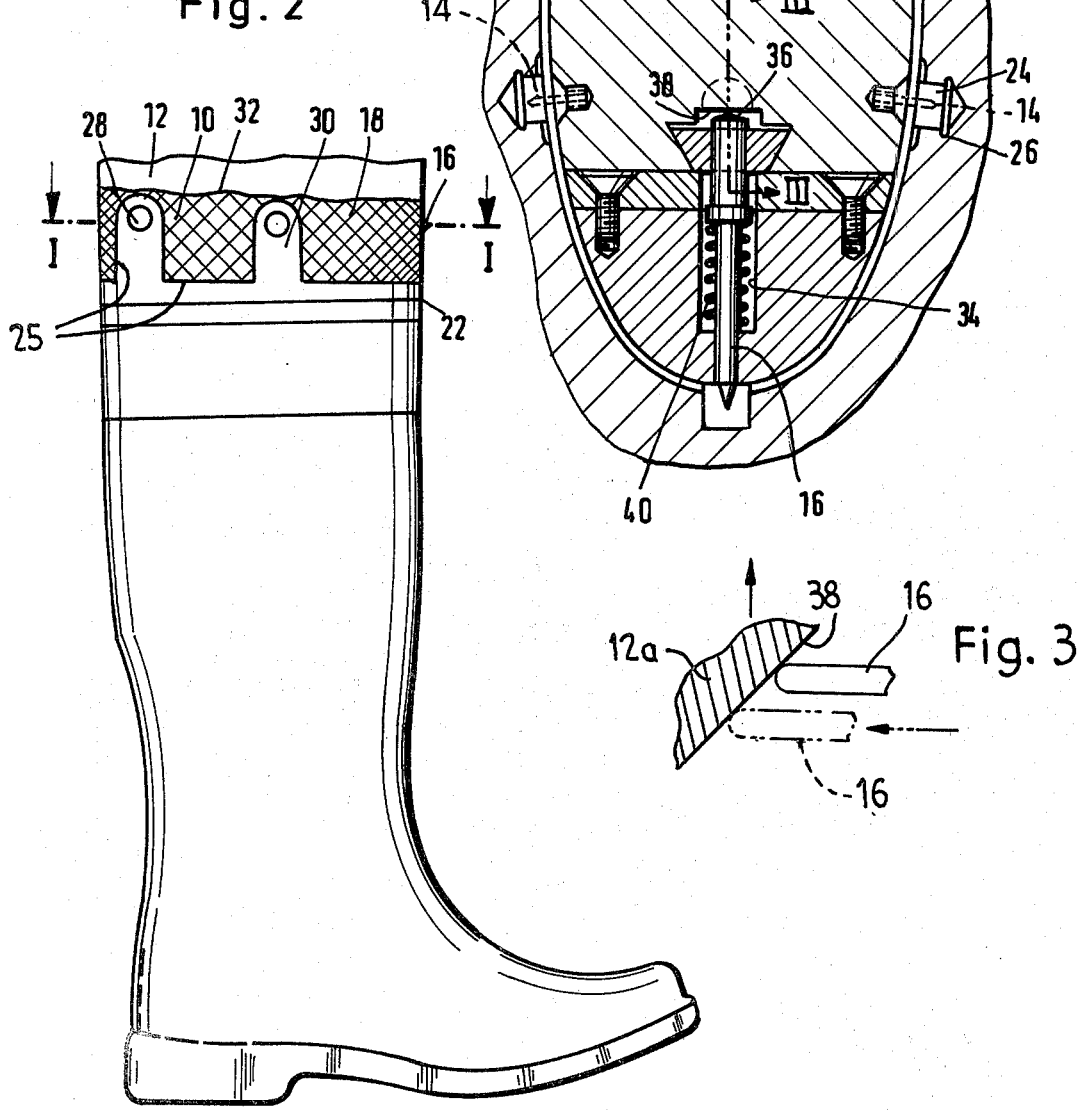

INJECTION MOLD DEVICE FOR FORMING AN ARTICLE SUCH AS FOOTWEAR

BACKGROUND OF THE INVENTION

This invention relates generally to an injection or vulcanization mold device for forming articles, such as footwear, and having male and female dies with a fabric liner covering the male die and with the female die spaced therefrom to define a mold cavity, liner retaining pins on the male die being located near the upper end of the fabric. More particularly, the liner is capable of being automatically stripped from the retaining pins after the molding operation.

When fabricating footwear, particularly boots, from thermoplastic material, a fabric sock is pulled onto the boot last prior to the mold injecting operation. The fabric sock must fit tightly and remain immovable in position on the boot last for the duration of the mold injection operation, as well as prior to such operation. Typically provided are fabric retaining pins rigidly mounted on the male die or boot last with the tips thereof projecting outwardly of the peripheral wall of the boot last and being located above the actual mold cavity at the upper border area of the fabric sock, which is subsequently removed by cutting to obtain a clean upper edge of the boot leg after the injection mold operation. The pins are distributed about the peripheral wall of the boot last so that a fold-free, tight and positively fitting retention of the fabric sock is effected.

When fabricating boots, prior to the mold injection operation and the closing of the female die, the fabric sock is pulled by hand onto the boot last and is lifted over the retaining pins so that the sock is pierced by the pins at its upper border area so as to be thereby maintained securely in place. The hinged female die is then closed and the mold cavity is filled with a plastic material which is intimately bonded with the outer surface of the fabric sock to form a two-layer boot structure. After the hinged female die is opened to facilitate removal of the finished boot, the upper border area of the fabric sock not coated with the plastic material must be stripped from the pins which continue to hold it, or it must be torn away. This procedure is carried out manually and requires a certain amount of expended time which could otherwise be saved during the fabrication process. Moreover, the fabric sock and/or the molded boot may be damaged when pulling the upper area of the fabric sock off the pins. And, if the pins remain engaged with the fabric sock and if the boot, which is still soft, is torn from the boot last, such could easily be damaged or deformed. Besides, during the removal of the fabric sock from the retaining pins, torn pieces of the sock could reach the mold cavity, which is undesirable.

SUMMARY OF THE INVENTION

It is therefore an object of the present invention to avoid the aforementioned drawbacks of the prior art injection or vulcanization mold devices, and to improve upon the mold device in sch a manner that the stripping operation of the molded boot from the boot last, and particularly the stripping of the fabric sock from the retaining pins, is simplified so that automatic removal of the molded boot from the mold device is possible.

In carrying out the invention, one of the retaining pins is mounted in one part of a two-part male die for retracting axial movement for disengaging the tip thereof from the liner, and cooperating means acting between the parts of the male die effect such axial movement upon a relative shifting of the parts. The remaining pins are rigidly mounted to the other male die part, and the female die has recesses surrounding the tips of these pins, and further has undercuts at the recesses and grooves extending between these recesses and the mold cavity to facilitate filling the recesses and the undercuts with plastic material so as to form plastic plugs which adhere to the liner. Thus, the plugs and the liner adhering thereto are removed from the rigidly mounted pins upon removal of the female die from the article after forming, and the plugs separate from the female die as it continues to be removed from the boot.

Further in accordance with this invention, such cooperating means comprise a bearing surface on the other of the male die parts which slopes upwardly toward the one male die part, and a spring surrounding the retractable retaining pin biases the same against this bearing surface so that, when the other male die part is lifted axially out of the boot, the movable retaining pin is retracted from engagement with the fabric liner.

Other objects, advantages and novel features of the invention will become more apparent from the following detailed description of the invention when taken in conjunction with the accompanying drawings.

BRIEF DESCRIPTION OF THE DRAWINGS

FIG. 1 is a cross-sectional view of an injection mold device in the area of the retaining pins, taken substantially along the line I—I of FIG. 2;

FIG. 2 is a side elevational view of an injection molded boot shown with the boot last and exposed fabric liner in place, but with the female die removed; and FIG. 3 is a sectional view taken substantially along the line III—III of FIG. 1.

DETAILED DESCRIPTION OF THE INVENTION

Turning now to the drawings wherein like reference characters refer to like and corresponding parts throughout the several views, the injection mold device shown in cross-section in FIG. 1 is suitable for forming a boot of plastic material illustrated in FIG. 2. The boot has an inner layer in the form of a fabric sock 10 and a fashioned outer layer of thermoplastic material.

In accordance with standard procedures, the fabric sock is pulled over a two-part boot last 12 and is tightly secured thereto by means of a plurality of retaining pins 14, 16 which penetrate through an upper area 18 of the fabric sock. A female die 20, typically comprised of two parts hinged together (the hinging being omitted for clarity) encloses the fabric sock and is spaced a predetermined distance therefrom to form a mold cavity from an upper edge 22 of the boot and throughout the remainder thereof. As will be seen, after the injection molding operation, the boot is severed along edge 22 to provide a finished and presentable upper edge. However, the female die extends upwardly of edge 22 and surrounds upper area 18 of the liner, although no mold cavity is defined at this upper end.

Retaining pins 14 and 16 are located above the upper end of the mold cavity, and pins 14 are rigidly mounted in boot last part 12a with their pointed tips projecting beyond the outer periphery of this boot last part and through portions at upper area 18 of the fabric liner for retaining it in place in the normal manner. Pins 14 are threaded in place so as to be easily replaced when broken or when to be exchanged. The female die has recesses 24 into which the pins project, and the female die further has undercuts 26 at these recesses, as well as grooves 25 extending between the recesses and the mold cavity to facilitate the filling of recesses 24 and undercuts 26 with the plastic material during injection molding so as to form plastic plugs 28 which adhere to the liner. And, when grooves 25 are filled with the plastic material, they form tongues 30 which support the plugs. The plugs are positively retained in the female die sections via the plastic material filling undercuts 26.

Thus, after the injection molding process is completed, the hinged female die sections are opened as they are pulled away from the formed boot. During opening, the plugs are formed in the recesses and the liner adhering thereto are removed from pins 14 (which are thin and extend only shortly into the plugs) while being retained with the hinged female die via the plastic filled undercuts 26. At a predetermined further open extent of the female die, the plugs break away therefrom at undercuts 26 and the inner surfaces of tongues 30 snap against the pointed tips of pins 14. Since the upper ends of the tongues extend to the upper edge 32 of the fabric liner, and since the sock is adhered to the plastic tongues, the tips of pins 14 cannot penetrate the fabric liner and do not reenter the holes left in the plugs after pin separation since the pins are now out of alignment therewith.

Parts 12a and 12b of the boot last are relatively shiftable as part 12a is manually lifted outwardly through the top end of the molded boot. A dovetail slot or mortise in part 12a receives a tenon mounted on part 12b for retaining the parts together in a crosswise direction but permitting part 12a to be shifted upwardly through the upper end of the boot. Pin 16 is mounted in part 12b for axial movement from its position shown in FIG. 1 to a retracted position in which its pointed tip is disengaged from the fabric liner. An inner end of pin 16 is slideable through an opening provided in the tenon piece, and its inner terminal end 36 is rounded and bears against a bearing surface 38 on part 12a. This bearing surface slopes upwardly and toward part 12b, as shown in FIG. 3, and a coil spring 40 within bore 34 maintains pin 16 biased against bearing surface 38. Thus, when part 12a is shifted upwardly in the direction of the vertical arrow of FIG. 3, after pins 14 are disengaged, pin 16 slides along bearing surface 38 and shifts inwardly in the direction of the horizontal arrow of FIG. 3 for retracting its pointed tip from the fabric sock.

During reassembly for another mold injection operation, a mating together at the parts 12a and 12b effects a projection of pin 16 against the force of spring 40 via bearing surface 38.

After the male die parts are removed, the molded boot is trimmed by cutting along edge 22.

From the foregoing, it can be seen that an automatic, less time consuming and more highly effective removal operation of of the fabric sock liner is made possible by the present invention.

Obviously, many other modifications and variations of the present invention are made possible in the light of the above teachings. It is therefore to be understood that within the scope of the appended claims the invention may be practiced otherwise than as specifically described.

What is claimed is:

1. An injection mold device for forming an article such as footwear from plastic material, comprising a two-part male die such as a boot last, a fabric liner covering said male die, a split female die surrounding said male die in spaced relation and forming together therewith a mold cavity for the article terminating inwardly adjacent an upper free end of said liner, a plurality of pins mounted in said male die and having tips projecting outwardly of the peripheral wall of said male die and through said liner for retaining same in place during an injection molding operation, said pins being located adjacent said upper end of said liner, one of said pins being mounted in one of the parts of said male die for retracting axial movement for disengaging the tip thereof from said liner, cooperating means acting between said one part and the other part of said male die for effecting said axial movement upon a relative shifting of said parts, the remainder of said pins being rigidly mounted in said other male die part, said female die confronting said rigidly mounted pins and having recesses into which said tips thereof project, said female die further having undercuts at said recesses and grooves extending between said recesses and the mold cavity to facilitate filling said recesses and undercuts with the plastic material so as to form plastic plugs which adhere to said liner, whereby said plugs and said liner adhering thereto are removable from said rigidly mounted pins upon removal of said female die from the article after forming, and said plugs are separable from said female die at said removal thereof.

2. The mold device according to claim 1, wherein said cooperating means comprise a bearing surface on said other male die part upwardly sloping toward said one part, and means in said other part biasing an inner end of said one pin against said bearing surface.

3. The mold device according to claim 1, wherein said grooves define plastic tongues supporting said plugs when filled with the plastic material.

4. An injection mold device for forming an article such as footwear from plastic material, comprising a two-part male die such as a boot last, a fabric liner covering said male die, a split female die surrounding said male die in spaced relation and forming together therewith a mold cavity for the article terminating inwardly adjacent an upper free end of said liner, a plurality of pins mounted in said male die and having tips projecting outwardly of the peripheral wall of said male die and through said liner for retaining same in place during an injection molding operation, said pins being located adjacent said upper end of said liner, at least one of said pins being mounted in one of the parts of said male die for retracting axial movement for disengaging the top thereof from said liner.

5. An injection mold device for forming an article such as footwear from plastic material, comprising a two-part male die such as a boot last, a fabric liner covering said male die, a split female die surrounding said male die in spaced relation and forming together therewith a mold cavity for the article terminating inwardly adjacent an upper free end of said liner, a plurality of pins mounted in said male die and having tips projecting outwardly of the peripheral wall of said male die and through said liner for retaining same in place during an injection molding operation, said pins being located adjacent said upper end of said liner, at least one of said pins being rigidly mounted in one of the parts of said male die, said female die confronting said rigidly mounted pins having recesses into which said tips thereof project, the improvement comprising said female die further having undercuts at said recesses and grooves extending between said recesses and the mold cavity to facilitate filling said recesses and undercuts with the plastic material so as to form plastic plugs which adhere to said liner, whereby said plugs and said liner adhering thereto are removable from said rigidly mounted pins upon removal of said female die from the article after forming, and said plugs are separable from said female die at said removal thereof.

* * * * *